US011589567B2

(12) United States Patent
Lucev

(10) Patent No.: US 11,589,567 B2
(45) Date of Patent: Feb. 28, 2023

(54) FISHING ROD HOLDER

(71) Applicant: Gorki Lucev, Ridgefield, NJ (US)

(72) Inventor: Gorki Lucev, Ridgefield, NJ (US)

(*) Notice: Subject to any disclaimer, the term of this patent is extended or adjusted under 35 U.S.C. 154(b) by 384 days.

(21) Appl. No.: 16/586,443

(22) Filed: Sep. 27, 2019

(65) Prior Publication Data
US 2020/0100487 A1    Apr. 2, 2020

Related U.S. Application Data

(60) Provisional application No. 62/737,293, filed on Sep. 27, 2018.

(51) Int. Cl.
*A01K 97/10*    (2006.01)
*B63B 17/00*    (2006.01)

(52) U.S. Cl.
CPC .............. *A01K 97/10* (2013.01); *B63B 17/00* (2013.01)

(58) Field of Classification Search
CPC ........ A01K 97/10; A01K 91/08; A01K 91/18; A01K 69/00; A01K 91/10; A01K 93/02; A01K 91/053; B63B 17/00
USPC ................................ 43/54.1, 21.2, 57.3, 27.4
See application file for complete search history.

(56) References Cited

U.S. PATENT DOCUMENTS

| | | | |
|---|---|---|---|
| 2,211,278 A | 8/1940 | Lefebvre | |
| 2,243,388 A * | 5/1941 | Magyarosi | A01K 97/10 248/514 |
| 2,481,272 A | 9/1949 | Williams | |
| 2,522,255 A | 9/1950 | Climo | |
| 2,693,332 A * | 11/1954 | Albert | A01K 97/10 248/538 |
| 2,724,569 A * | 11/1955 | Licata | A01K 97/10 403/53 |
| 2,851,234 A | 9/1958 | Scheifele | |
| 3,154,274 A | 10/1964 | Hillcourt | |
| 3,246,865 A | 4/1966 | Latimer | |
| 3,521,332 A * | 7/1970 | Kramer | F16B 2/22 403/188 |
| 4,031,651 A * | 6/1977 | Titze | A01K 97/11 43/15 |
| 5,365,689 A | 11/1994 | Holliman | |

(Continued)

FOREIGN PATENT DOCUMENTS

| | | |
|---|---|---|
| GB | 2399481 A | 9/2004 |
| NL | 8102672 A | 1/1983 |

OTHER PUBLICATIONS

Written Opinion, dated Feb. 6, 2020, for corresponding PCT Application No. PCT/US2019/053609, International Filing date Sep. 27, 2019, consisting of 6 pages.

(Continued)

*Primary Examiner* — Kathleen I Alker
*Assistant Examiner* — Jeffrey R Larsen
(74) *Attorney, Agent, or Firm* — Gearhart Law LLC

(57) ABSTRACT

A fishing rod holder is described. The fishing rod holder may be used in a variety of manners, including on land and at sea (on a boat). The fishing rod holder may be used in a recess or a sleeve built into the boat, used in a fighting chair, or even held by the fisherman as needed. The rod holder may further allow the fishing rod to rotate during, for example, trolling or other types of fishing. The fishing rod holder also includes a structure that supports the fishing rod when the fishing rod begins to bend or flex under the weight of a fish.

13 Claims, 9 Drawing Sheets

(56) References Cited

U.S. PATENT DOCUMENTS

| | | | |
|---|---|---|---|
| 5,813,162 A | 9/1998 | Tse et al. | |
| 6,213,441 B1 | 4/2001 | Baynard et al. | |
| 7,331,138 B1* | 2/2008 | Wegman | A01K 97/10 |
| | | | 248/523 |
| 9,220,252 B1* | 12/2015 | Arcabascio | A01K 97/10 |
| 2003/0182842 A1* | 10/2003 | Ruiz | A01K 97/10 |
| | | | 43/21.2 |
| 2003/0217500 A1 | 11/2003 | Ernst | |
| 2007/0028504 A1 | 2/2007 | Cameron | |
| 2008/0087782 A1* | 4/2008 | Sutherland | A01K 97/10 |
| | | | 248/231.9 |
| 2009/0084019 A1* | 4/2009 | Carnevali | F16M 11/2078 |
| | | | 43/21.2 |
| 2012/0017487 A1 | 1/2012 | O'Keefe | |
| 2013/0019515 A1* | 1/2013 | Holzer | A01K 97/10 |
| | | | 43/21.2 |
| 2016/0073618 A1* | 3/2016 | Smith | A01K 87/02 |
| | | | 403/286 |
| 2016/0255823 A1 | 9/2016 | Thomas | |

OTHER PUBLICATIONS

International Search Report, dated Feb. 6, 2020, for corresponding PCT Application No. PCT/US2019/053609, International Filing Date Sep. 27, 2019, consisting of 13 pages.

\* cited by examiner

FISHING ROD HOLDER

CLAIM OF PRIORITY

This application claims priority to U.S. Application 62/737,293 filed on Sep. 27, 2018, the entire contents of which are hereby fully incorporated by reference in its entirety.

FIELD OF THE EMBODIMENTS

The field of the present invention and its embodiments relate to rod holders for sport and/or recreational fishing. The present rod holder may be used with or without additional equipment, such as a harness, fighting chair, etc.

BACKGROUND OF THE EMBODIMENTS

Fishing rod holders are apparatuses designed to hold, secure, or otherwise retain a fishing rod, either permanently or temporarily, while in use by a fisherman, and thereby freeing up the hands of the fisherman for other tasks. Typically, fishing rod holders have been designed for securement to a ground surface (e.g., sand, soil, etc.) or to a portion of a boat (e.g., upper rail or gunwale) used for fishing. Some of these fishing rod holders include a vertical support, which is secured to a mount affixed to the rail of a boat by means of a threaded attachment.

In use, fishing rod holders hold a rod so that the handle and reel are generally above the boat rail. The remaining shaft portion of the rod and the line are held out over the water in an outrigger fashion. However, when a fish is caught on the line, particularly a large fish, a drawn out battle between the fisherman and fish begins. It is imperative to the integrity of the fishing pole and the fishing line that certain actions be taken to prevent damage to the equipment and potential loss of the prized catch. Thus, it is important that the fishing rod not only be secured, but further, that the rod be supported by the rod holder when the fish is "running" or other stress is being applied to the fishing rod. Further, such a fishing rod holder should enable a person to move about the rear of the boat as needed to prevent the fishing line from becoming entangled with other fishing equipment or the boat itself. The present invention and its embodiments meet and exceed these objectives.

Review of Related Technology

U.S. Pat. No. 6,213,441 pertains to a fishing rod holder mount comprising a base unit which can be secured or affixed to a supporting surface such as the upper rail or gunwale of a boat; a shaft which is received by the base unit and therefore secured to the supporting surface; and an interlocking mechanism between the base and shaft which prevents the shaft and therefore the fishing rod holder from rotating about the shaft axis. The fishing rods held by the fishing rod holder are prevented from rotating across the boat or supporting surface. Therefore, the fishing rod is prevented from striking a boat occupant, tangling with other rods or objects, and prevented from complicating reeling in of a fish.

U.S. Published Patent Application No. 2016/0255823 pertains to a rod holder assembly that holds an object such as a rod receiver for a fishing rod in a desired orientation that is manually and singlehandedly adjustable about the horizontal and/or vertical axes. The rod holder assembly can be set to lock in positional orientation or clutch in response to an external force. A method for using the rod holder assembly is also described.

U.S. Published Patent Application No. 2012/0017487 pertains to a modular fishing rod support device comprising a plurality of mounting elements, rod supporting elements and elongated bar attachments for supporting rods of various length in a working position. The mounting elements comprise a permanently mountable embodiment for attachment to a larger structure, along with an easily removable clamp embodiment for temporarily mounting to an acceptable base structure. A foot pedal is provided for attachment to the clamping device, or for operation on its own, which comprises a triangular body member, rod stem and attachment means for providing support for a fishing rod handle at a defined angle. A rod angle mount provides support for a rod handle using a pin and slot configuration, attachable to a pedestal mounting element for positioning a rod at a predefined angle therefrom. Elongated bar attachments provide parallel support along the length of the fishing rod, while U-channel support elements along the bar and a rod butt holder provide sufficient rod stability for maintaining its position under load from an extended lure, high winds or from an engaged fish.

U.S. Published Patent Application No. 2003/0217500 pertains to a fishing rod holder with a strike sensor that alerts the operator that a fish has been caught. The fishing rod holder allows for horizontal striking of fish either while trolling or still-fishing. The fishing rod holder consists of a rod holder support arm assembly, a rotating unit, a base unit and an optional mounting adapter. The rod holder may be mounted for horizontal striking on the top surface of a gunnel wall on a boat or other substantially flat horizontal surface. Alternatively, the mounting adapter may be used to mount the rod holder to a boat handle rail. The rod holder support arms are slidably engaged in the support arm assembly and allow for customized vertical orientation of the rod's tip with respect to the reel. In addition, the horizontal orientation of the rod may be customized to accommodate fishing technique and fishing conditions. Finally, there is a strike sensor to alert the operator that a fish has been caught.

Various systems and methodologies are known in the art. However, their structure and means of operation are substantially different from the present disclosure. The other inventions fail to solve all the problems taught by the present disclosure. At least one embodiment of this invention is presented in the drawings below and will be described in more detail herein.

SUMMARY OF THE EMBODIMENTS

In general, the present invention and its embodiments describe a fishing rod holder that can be used in a variety of manners. The present rod holder may be used in a recess or sleeve built into the boat, used in a fighting chair, used in a fighting belt, or even held by the fisherman as he/she fights the fish. The rod holder also allows the rod to rotate as needed during, for example, trolling or other types of fishing. The rod holder further has a feature that supports the rod when the rod begins to bend or flex under the weight of the fish. This support feature helps the fisherman maintain leverage over the fish, but also helps to preserve the integrity of the fishing rod and line.

A first embodiment of a fishing rod holder is described. In this first embodiment, the fishing rod holder includes: a positioning member, a support member, and a tubular member. The positioning member, the support member, and/or the tubular member may comprise a metallic material and/or other materials not explicitly listed herein.

The fishing rod holder may also include an anchor member that couples the positioning member and the support member. In examples, a first end of the anchor member may be coupled to the positioning member and a second end of the anchor member may be coupled to the support member. The support member extends from the positioning member. In some examples, the support member includes at least one straight portion and at least two bends. According to this embodiment, the support member and the positioning member are at an angle of between about 35° to about 65° with respect to each other.

Moreover, a support is disposed on a first end of the support member and is positioned below a midline of the tubular member. The support may be lined with a deformable material. In other examples, the support has a first and a second flange, as well as a trough located between the first flange and the second flange. A base of the trough is located below a midline of the tubular member.

In examples, an inner surface of the tubular member is lined with a protective material. According to some embodiments, the tubular member may be attached to the support member via a spring attachment. Further, in an embodiment, a first opening of the tubular member is flared outwards. In another example, the tubular member is flared from the first opening to the second opening. Moreover, a blocking member may traverse a second opening of the tubular member. The blocking member may contain at least one aperture.

The fishing rod holder may also include an eyelet coupled to the positioning member, the support member, and/or an anchor member. Moreover, a safety attachment mechanism may be coupled to the eyelet.

A second embodiment of a fishing rod holder is described. In this second embodiment, the fishing rod holder includes: a curved positioning member, a support member extending from a linear portion of the positioning member, a support disposed on a first end of the support member, and a tubular member. The support includes a first flange and a second flange such that a trough is formed between the first flange and the second flange. The support may be positioned below a midline of the tubular member. The tubular member may have a protective covering disposed on an inner surface. In examples, the tubular member is flared outwards at a first opening of the tubular member. In additional examples, a blocking member traverses a second opening of the tubular member. In further examples, the blocking member may comprise at least one aperture.

In general, the present invention succeeds in conferring the following, and others not mentioned, benefits and objectives.

It is also an object of the present invention to provide a rod holder that is lightweight and easy to use.

It is also an object of the present invention to provide a rod holder that may be used in different locations aboard a boat and moved among those locations while in use.

It is also an object of the present invention to provide a rod holder that supports at least one fishing rod therein.

It is also an object of the present invention to provide a rod holder that is resilient under stress.

It is also an object of the present invention to provide a rod holder that enables a fisherman to properly reel in a fish.

It is also an object of the present invention to provide a rod holder that assists a fisherman in fighting a fish.

It is also an object of the present invention to provide a rod holder that may be used in various types of fishing.

It is also an object of the present invention to provide a rod holder that supports the rod when the rod is bent by the weight of a fish.

In addition to the foregoing, other objects, features, aspects and advantages of the present invention will be better comprehended through a careful reading of a detailed description provided herein below with appropriate reference to the accompanying drawings.

DESCRIPTION OF THE PREFERRED EMBODIMENTS

Figure 1:
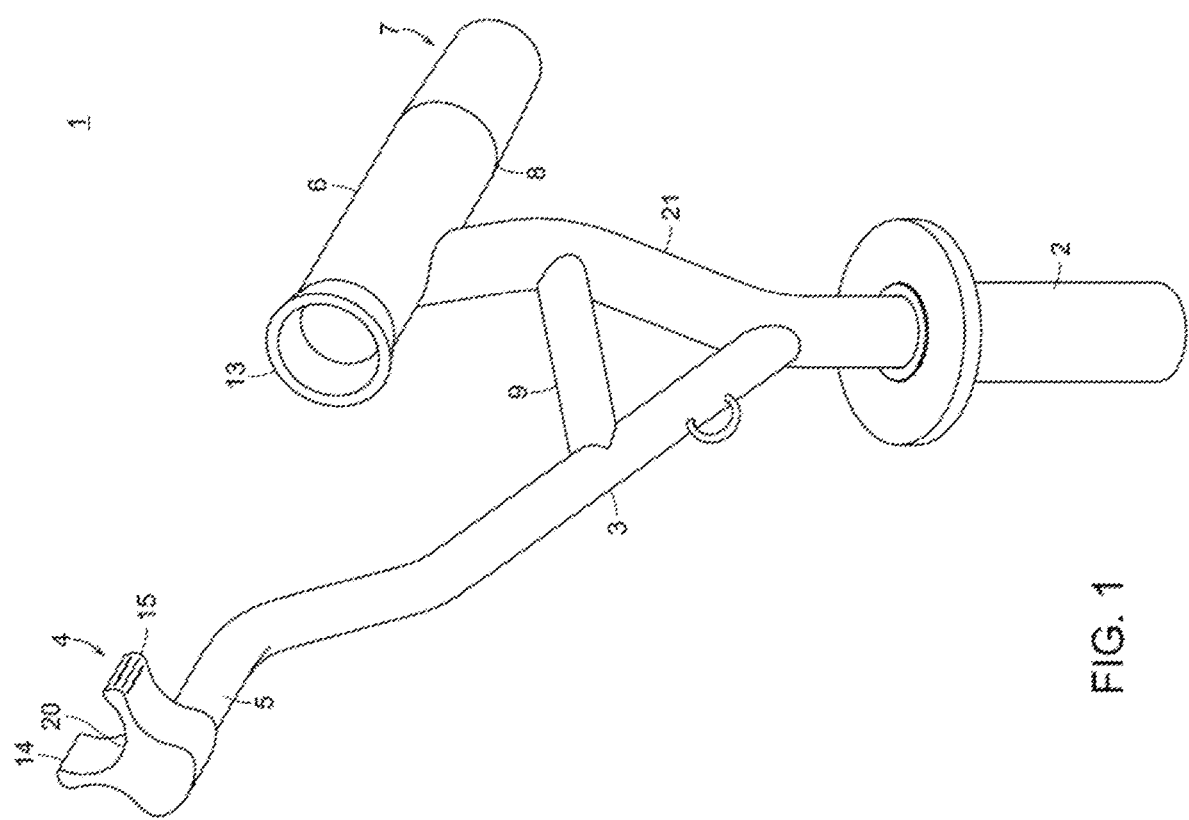
FIG. 1 is a front perspective view of an embodiment of a fishing rod holder.

The preferred embodiments of the present invention will now be described with reference to the drawings. Identical elements in the various figures are identified with the same reference numerals.

Reference will now be made in detail to several embodiments of the present invention. Such embodiments are provided by way of explanation of the present invention, which is not intended to be limited thereto. In fact, those of ordinary skill in the art may appreciate upon reading the present specification and viewing the present drawings that various modifications and variations can be made thereto.

FIG. 1 is a front perspective view of an embodiment of a fishing rod holder.

Referring now to FIG. 1, a fishing rod holder 1 is seen that can be used in a variety of manners. In one embodiment of the present invention, the fishing rod holder 1 can include a positioning member 2, a first support member 3 extending from the positioning member 2, and a second support member 21 extending from the positioning member 2. The fishing rod holder 1 may also include an anchor member 9 that can couple the first support member 3 to the second support member 21. The anchor member 9 may be located perpendicular to the positioning member 2 in examples. In other examples, the anchor member 9 may be located substantially perpendicular to the positioning member 2. The coupled anchor member 9 can bring more strength and stability to the structure, especially for a cantilevered design of the present invention.

According to examples, the first support member 3 is configured to attach to a first end 5. A support 4 can be disposed on the first end 5. In further examples, the first support member 3 can include at least one straight portion and at least two bends to allow for a compact, yet strong composition of the fishing rod holder 1. The at least two bends/kinks further allow for a reel to be turned downward in a resting position. Another embodiment of the first support member 3 may include a kink or a round bend in a horizontal manner, allowing the reel to face downwards and allowing a user's hand to have a hold of the reel without any interference form the first support member 3.

The support 4 provides numerous benefits to the fisherman. For example, the support 4 helps the fisherman maintain leverage over the fish, but also helps to preserve the integrity of the fishing rod and line. Moreover, the support 4 can include a first flange 14 disposed opposite a second flange 15 with a trough 20 located between the first flange 14 and the second flange 15. In additional examples, the support 4 can also be lined with a deformable material. The deformable material can help support the thin end of the rod, while also not scratching it.

According to examples, the second support member 21 is configured to attach to a tubular member 6. A blocking member 7 is configured to traverse a second opening 8 of the tubular member 6. The fishing rod holder 1, as described, supports the rod when the rod begins to bend or flex under the weight of the fish. The positioning member 2, the first support member 3, the second support member 21, and the tubular member 6 can comprise a metallic material that would be able to support a fishing rod and the forces exerted by it caused by the fighting fish. It should be appreciated that the material comprising the positioning member 2, the first support member 3, the second support member 21, and the tubular member 6 is not limited to a metallic material, and other materials are contemplated herein.

It is also an object of the present invention to provide a fishing rod holder 1 that is lightweight and easy to use. According to examples, the fishing rod holder 1 can support at least one fishing rod therein such that the fishing rod can be inserted into a first opening 13 of the tubular member 6 and a portion of the rod above the reel can rest on the support 4. According to other embodiments, the fishing rod holder 1 can comprise an alternate embodiment of the tubular member 6 such that the tubular member 6 can be large enough to hold multiple fishing rods.

Figure 2:
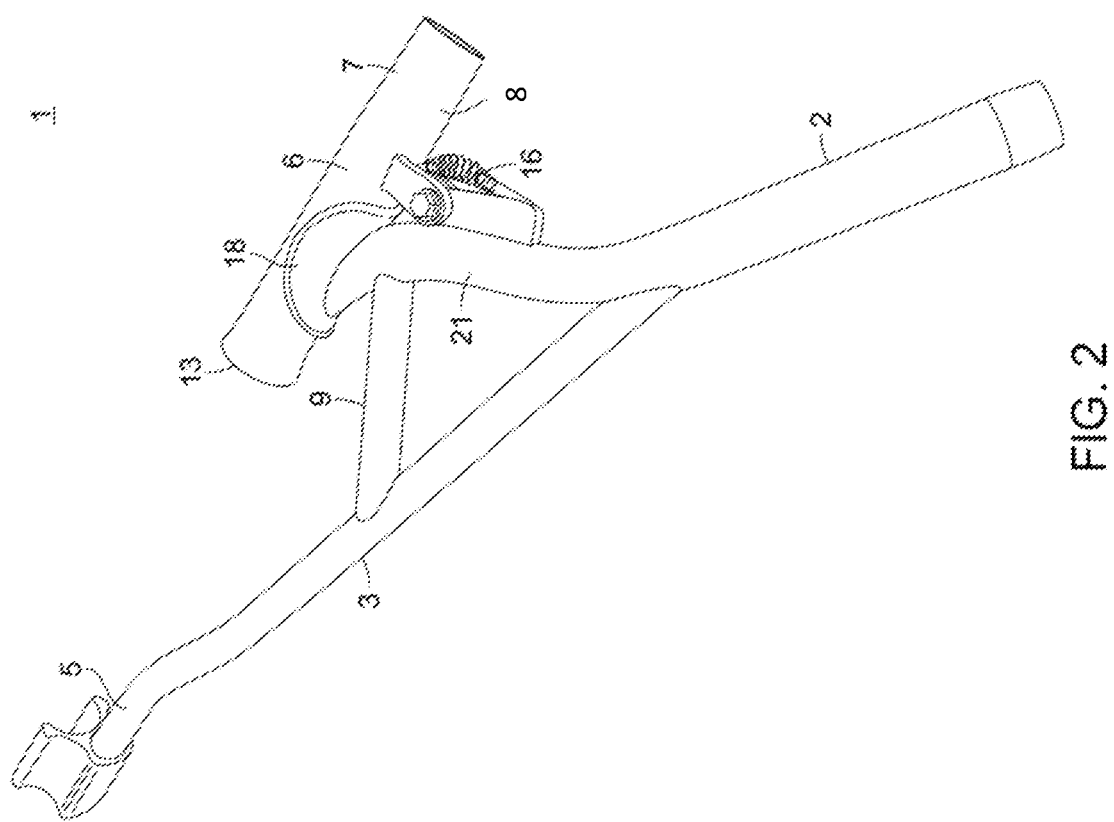
FIG. 2 is a side perspective view of another embodiment of a fishing rod holder.
Figure 3:
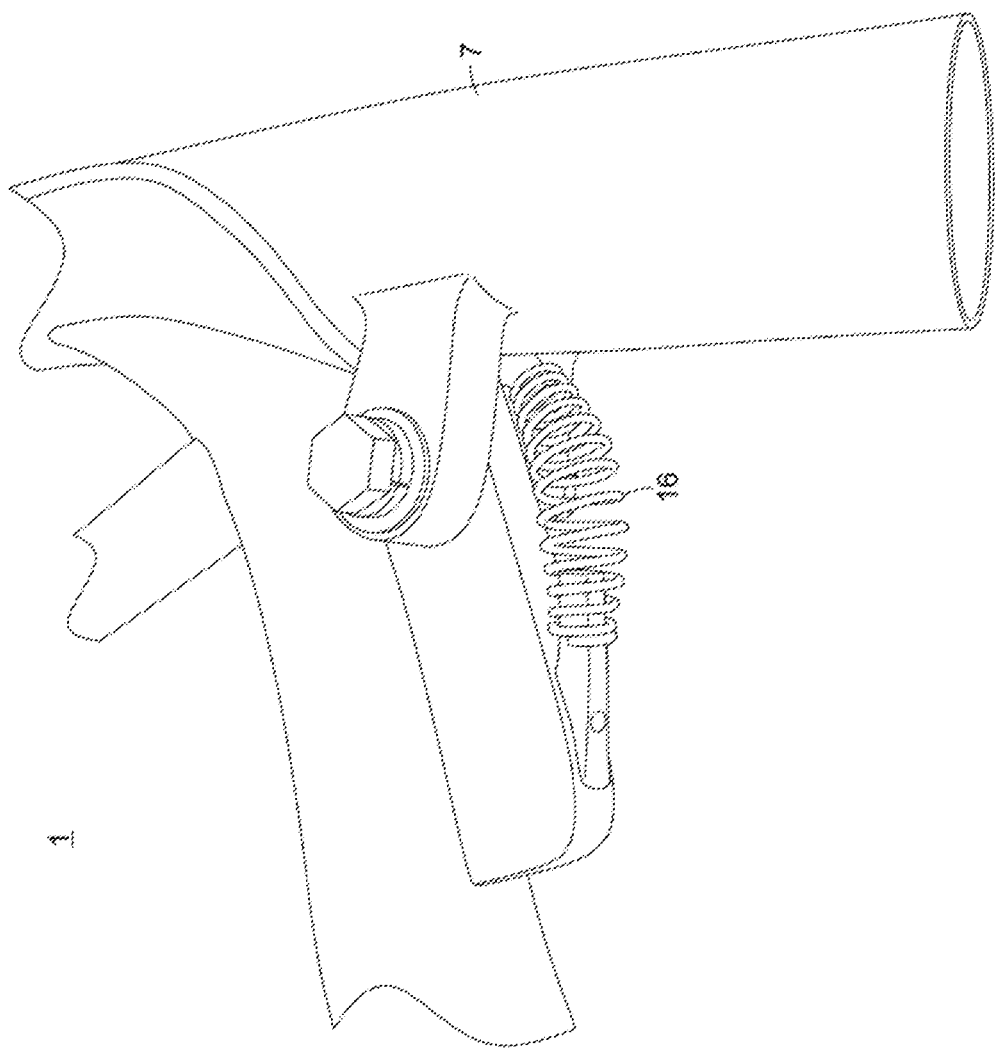
FIG. 3 is a side perspective view of a spring attachment component of another embodiment of a fishing rod holder.
Figure 4:
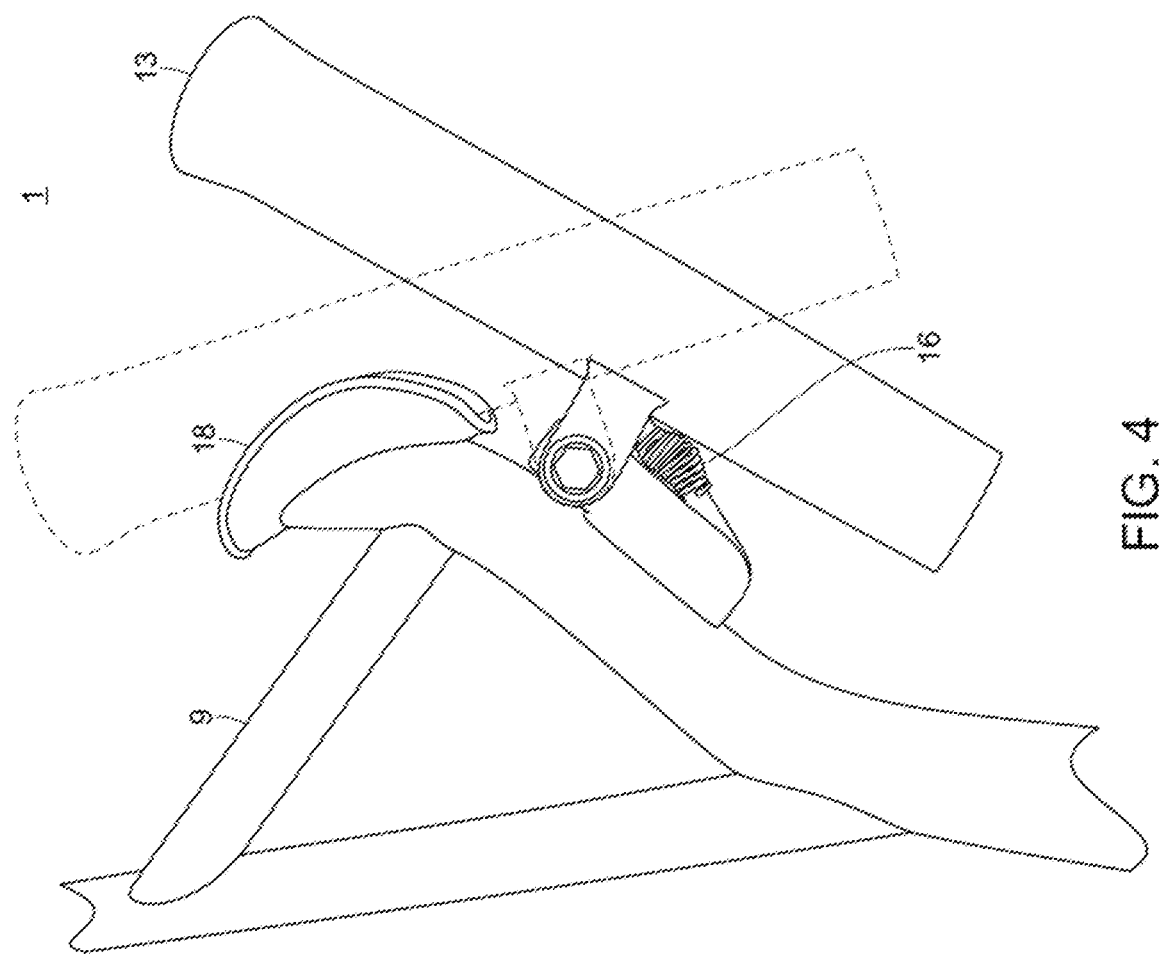
FIG. 4 is another side perspective view of another embodiment of a fishing rod holder.

As described, the fishing rod holder 1 may be used in a recess or sleeve built into a boat, used in a fighting chair, or even held by the fisherman as he/she fights the fish. The fishing rod holder 1 may be used in different locations aboard a boat and moved from one location to another while in use. The fishing rod holder 1 should be light enough to be easily picked up and placed in specific placement locations. The configuration of the fishing rod holder 1 also allows the fishing rod to rotate as needed during, for example, trolling or other types of fishing. FIG. 2 is a side perspective view of another embodiment of a fishing rod holder. FIG. 3 is a side perspective view of a spring attachment component of another embodiment of a fishing rod holder. FIG. 4 is another side perspective view of another embodiment of a fishing rod holder.

Referring now to FIG. 2-FIG. 4, another embodiment of the fishing rod holder 1 is depicted. The embodiment depicted in FIG. 2-FIG. 4 is substantially similar to and incorporates the components depicted and described in reference to FIG. 1, yet includes additional features.

According to this embodiment, the fishing rod holder 1 includes a positioning member 2, a first support member 3 extending from the positioning member 2, and a second support member 21 extending from the positioning member 2. The fishing rod holder 1 may also include an anchor member 9 that can couple the first support member 3 to the second support member 21.

According to examples, the first support member 3 is configured to attach to a first end 5. A support 4 can be disposed on the first end 5. Moreover, the second support member 21 is configured to attach to a tubular member 6. A blocking member 7 is configured to traverse a second opening 8 of the tubular member 6. In this example, a concave rest 18 is attached to the second support member 21 at a first position proximate the first opening 13. The tubular member 6 is configured to rest on the concave rest 18 at the first position proximate the first opening 13. The concave rest 18 is configured to hold the tubular member 6 and provide enhanced support for the tubular member 6.

The positioning member 2, the first support member 3, the second support member 21, the tubular member 6, and the concave rest 18 may comprise a metallic material that would be able to support a fishing rod and the forces exerted by it caused by the fighting fish. It should be appreciated that the material comprising the positioning member 2, the first support member 3, the second support member 21, the tubular member 6, and the concave rest 18 is not limited to a metallic material, and other materials are contemplated herein.

In this example, the tubular member 6 is additionally attached via an attachment mechanism to the second support member 21 at a second position proximate the second opening 8. In an embodiment, the attachment mechanism may comprise a spring attachment 16. The spring attachment 16 allows for rotation of the tubular member 6. Such rotation may prove useful when trolling or during other types of fishing.

Figure 5:
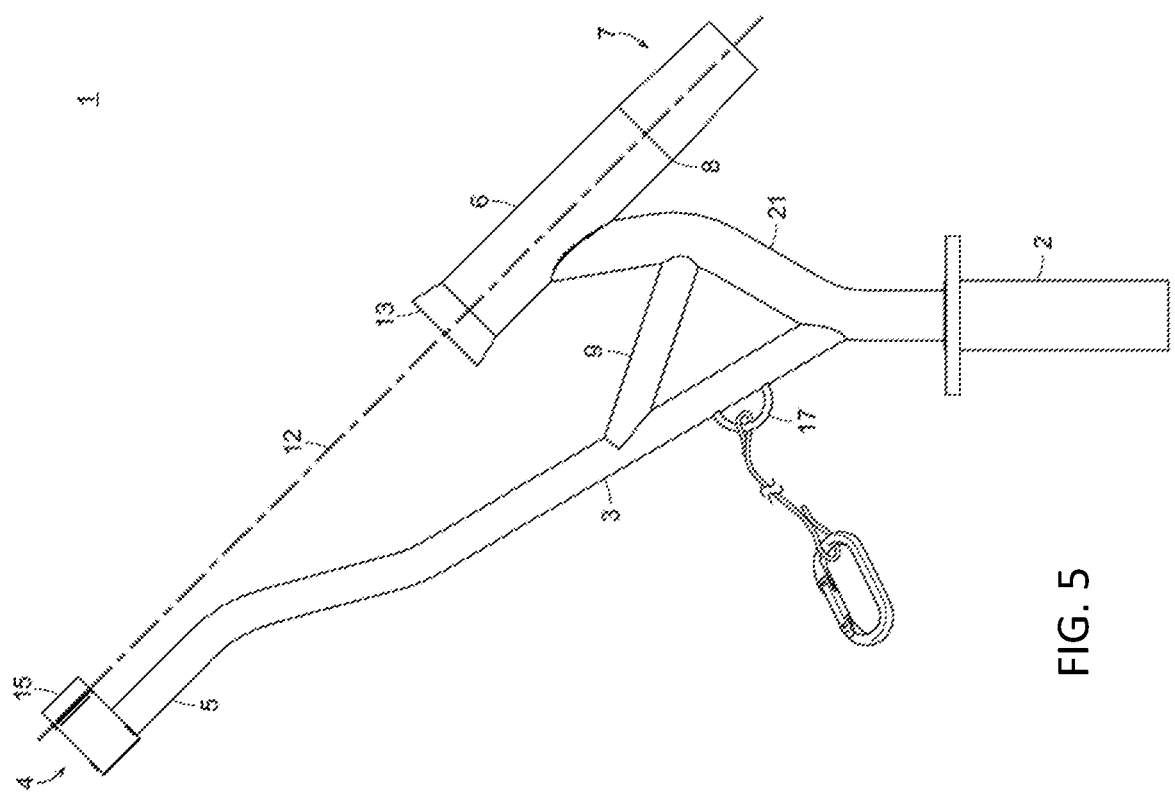
FIG. 5 is a side perspective view of an embodiment of a fishing rod holder.
Figure 6:
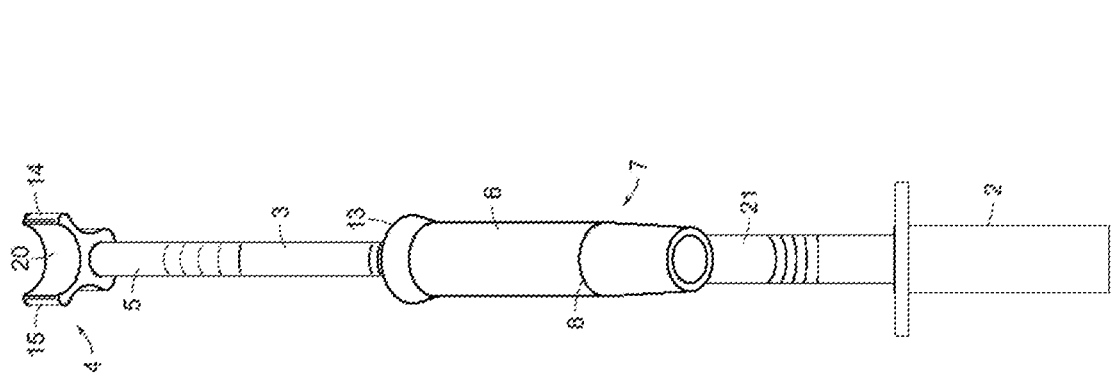
FIG. 6 is a rear perspective view of an embodiment of a fishing rod holder.

FIG. 5 is a side perspective view of an embodiment of a fishing rod holder. FIG. 6 is a rear perspective view of an embodiment of a fishing rod holder.

Referring now to FIG. 5 and FIG. 6, an embodiment of the fishing rod holder 1 is depicted. The embodiment depicted in FIG. 5 and FIG. 6 is substantially similar to and incorporates the components depicted and described in reference to FIG. 1, yet includes additional features.

According to FIG. 5 and FIG. 6, the first support member 3 includes at least one straight portion and at least two bends. This allows for a compact, yet strong composition of the fishing rod holder 1. Moreover, the at least two bends/kinks further allow for a reel to be turned downward in a resting position. Another embodiment of the first support member 3 includes a kink, or round bend in a horizontal manner, allowing the reel to face downwards and allowing a user's hand to have a hold of the reel without any interference form the first support member 3.

As depicted in FIG. 1, the support 4 can include a first flange 14 disposed opposite a second flange 15 with a trough 20 located between the first flange 14 and the second flange 15. According to FIG. 5 and FIG. 6, the support 4 can be positioned below a midline 12 of the tubular member 6 or, more specifically, a base of the trough 20 can be positioned below the midline 12 of the tubular member 6. Even more specifically, a lower most portion of the trough 20 can be positioned below an extension of the line formed by the bottom portion of the tubular member 6. This allows for a fishing rod to stand in the tubular member 6 properly and be supported only when a certain amount of force pulls the flexible end of the rod down.

Moreover, as depicted in FIG. 5 and FIG. 6, the first opening 13 of the tubular member 6 may be flared outwards. This allows for the further bending of the fishing rod, without the fishing rod having to bend across a sharp edge. According to other examples, the tubular member 6 can also be flared or narrowed from the first opening 13 to the second opening 8, or even to the blocking member 7. This narrowing allows for a stable point for the tip of the fishing rod to press up against, while allowing some movement of the outer portion of the fishing rod as the fish tries to move back and forth.

According to additional embodiments, the tubular member 6 can also include or comprise protective material, such as padding or rubber. However, it should be appreciated that the protective material is not limited to those materials described herein and other materials are contemplated. The additional protective material helps cushion the force of the fishing rod when the fishing rod hits the inside of the tubular member 6 (e.g., when the rod is jerked violently back and forth to attempt to catch a fish). The additional protection material may also assist in keeping the rod scratch-free.

In additional examples, the fishing rod holder 1 may further include an eyelet 17. As depicted, the eyelet 17 may be coupled to the first support member 3. However, in other embodiments, the eyelet 17 may be alternatively coupled to: the positioning member 2 or the anchor member 9. In examples, the eyelet 17 can be used to attach a safety mechanism to the fishing rod holder 1. The safety mechanism may include: a clip or a carabiner, among other examples not explicitly listed herein, that helps attach the fishing rod holder 1 to a location on the boat. This is helpful especially during rough seas, so that if the fishing rod holder 1 slips out of its position, it will not be lost.

Moreover, the fishing rod holder 1 may include a retaining mechanism located at or attached to the first support member 3 and/or the second support member 21. The retaining mechanism may help keep the fishing rod from springing upwards during use. Further, the retaining mechanism may also loop over the first support member 3 and/or the second support member 21 and may utilize one or more attachment mechanisms. Such attachment mechanisms may include: a hook and loop system or holes for attaching to a flange or button. It should be appreciated that the attachment mechanisms are not limited to those explicitly described herein.

Figure 7:
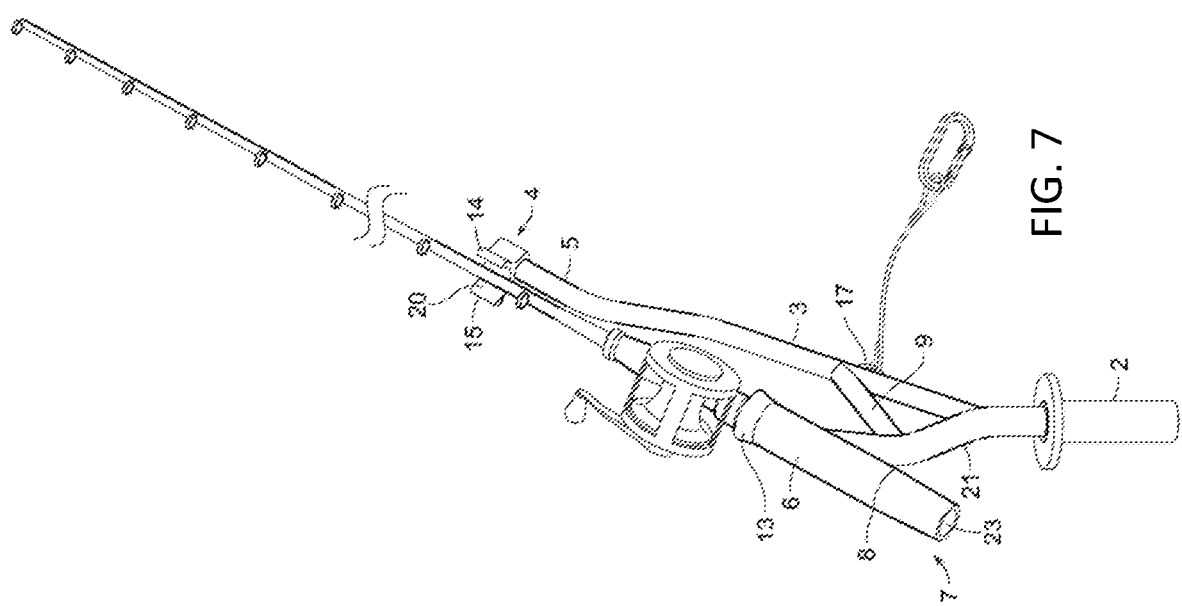
FIG. 7 is a rear perspective view of an embodiment of a fishing rod holder with a fishing rod held therein.

FIG. 7 is a rear perspective of an embodiment of a fishing rod holder with a fishing rod held therein.

Referring now to FIG. 7, an embodiment of a fishing rod holder with a fishing rod held therein 1 is depicted. The embodiment depicted in FIG. 7 is substantially similar to and incorporates the components depicted and described in reference to FIG. 1, yet includes additional features.

As described in FIG. 1, a blocking member 7 is configured to traverse a second opening 8 of the tubular member 6. According to FIG. 7, the blocking member 7 includes at least one aperture 23. The at least one aperture 23 is small enough to not allow the fishing rod to slide down the tubular member 6, but allows for draining of water collected within the tubular member 6. According to examples, the at least one aperture 23 may be circular and may be located on the end of the blocking member 7. In other examples, the at least one aperture 23 may comprise a different shape, such as a rectangular shape, a square shape, a triangular shape, among others. In additional examples, the at least one aperture 23 may be in the form of a gap located between the blocking member 7 and the tubular member 6. It should be appreciated that the shape of the at least one aperture 23 is not limited to those shapes explicitly listed herein and other shapes are contemplated.

According to additional embodiments, the blocking member 7 may be configured to swivel or turn on a hinge, such that the blocking member 7 does not have a permanent aperture, but can produce the at least one aperture 23 by swiveling, in order to let water that has been collected drain out.

Moreover, as described in FIG. 1, the fishing rod holder 1 may also include an anchor member 9 that can couple the first support member 3 to the second support member 21. The coupled anchor member 9 can bring more strength and stability to the structure, especially for a cantilevered design of the present invention. The first support member 3 and the positioning member 2 can include an angle of between about 35° to about 65° with respect to each other.

Figure 8:
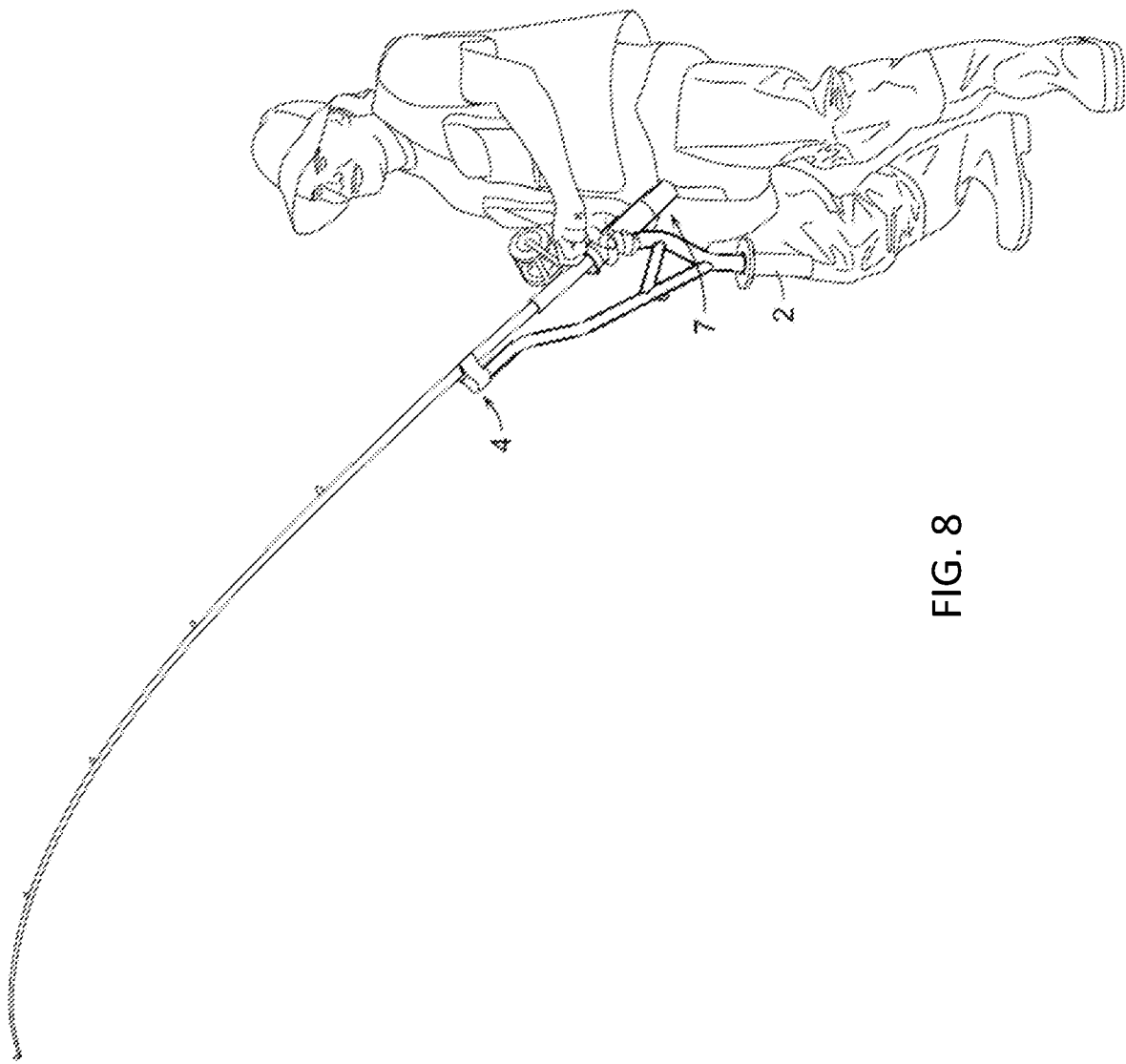
FIG. 8 illustrates a first intended use of an embodiment of a fishing rod holder.

FIG. 8 illustrates a first intended use of an embodiment of a fishing rod holder.

Referring now to FIG. 8, a first intended use of an embodiment of a fishing rod holder is depicted. The embodiment depicted in FIG. 8 is substantially similar to and incorporates the components depicted and described in reference to FIG. 1, yet includes additional features.

In this embodiment, the fishing rod holder 1 may additional include a resting member affixed to the blocking member 7 and/or the tubular member 6. The resting member may include padding, in some examples. The padding may be made of numerous materials. In examples, the padding may be made of shape memory polymer materials, such as polyurethane or synthetic foam. However, the padding may be made of any material and may include a material not explicitly listed herein. The padding allows the user to press up against the fishing rod holder 1 in order to give more support to the apparatus, and to get more a stable position. In other examples, the resting member may be configured of a shape-formable material allowing the resting member to be shaped to fit against the user's abdomen area. In further embodiments, the resting member is configured such that the tubular member 6 may swivel vertically or horizontally.

Figure 9:
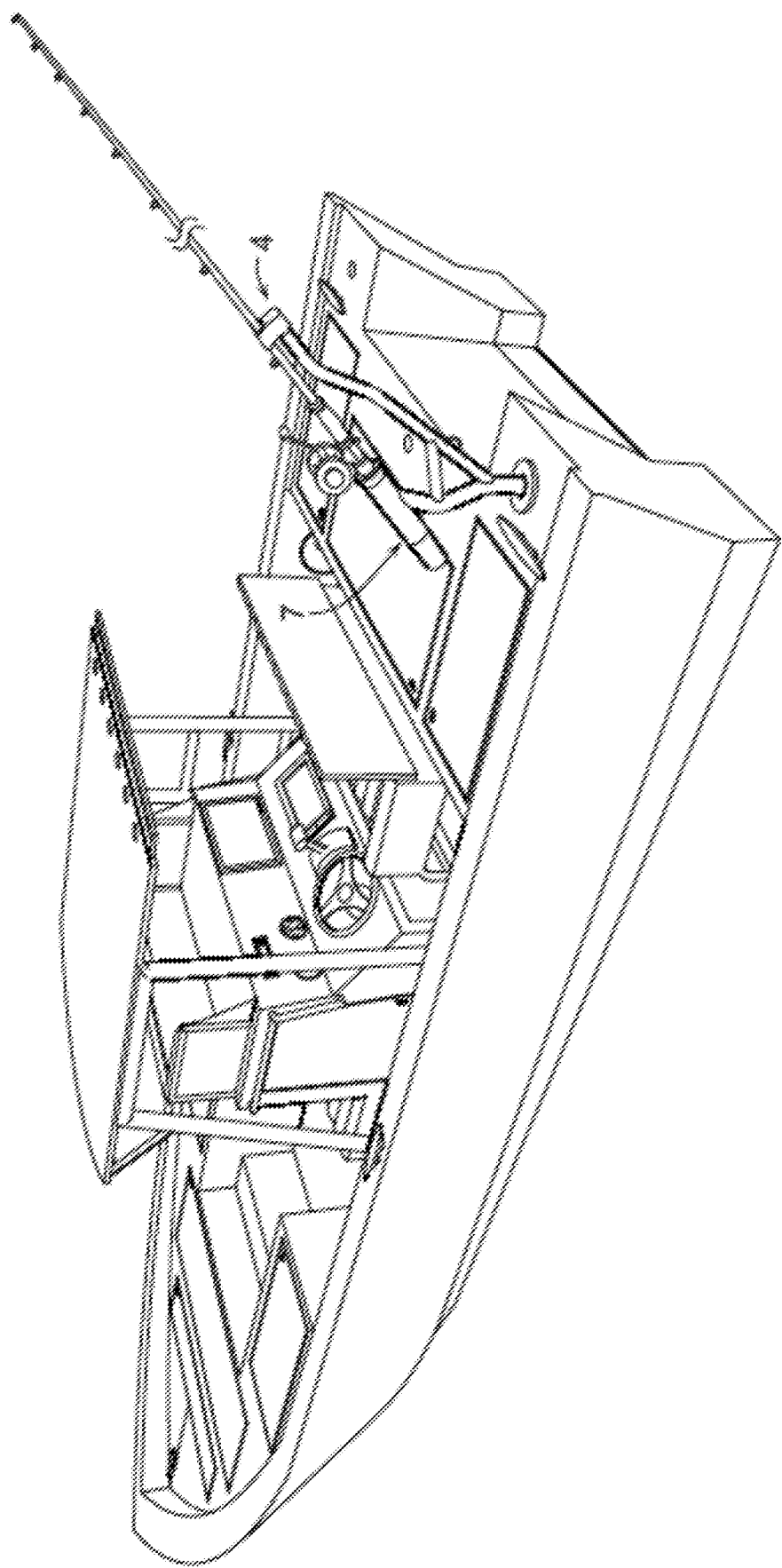
FIG. 9 illustrates a second intended use of an embodiment of a fishing rod holder.

FIG. 9 illustrates a second intended use of an embodiment of a fishing rod holder.

Referring now to FIG. 9, a second intended use of an embodiment of a fishing rod holder is depicted. The embodiment depicted in FIG. 9 is substantially similar to and incorporates the components depicted and described in reference to FIG. 1, yet includes additional features. FIG. 9 depicts the fishing rod holder 1 coupled to a boat for use.

In addition to the foregoing, other objects, features, aspects and advantages of the present invention will be better comprehended through a careful reading of a detailed description provided herein below with appropriate reference to the accompanying drawings.

Although this invention has been described with a certain degree of particularity, it is to be understood that the present disclosure has been made only by way of illustration and that numerous changes in the details of construction and arrangement of parts may be resorted to without departing from the spirit and the scope of the invention.

What is claimed is:

1. A rod holder comprising:
a positioning member;
a first support member and a second support member extending from the positioning member,
wherein a support is disposed on a first end of the first support member,
wherein the support comprises a first flange and a second flange such that a trough is formed between the first flange and the second flange, and
wherein the first support member comprises a first bend and a second bend along a length of the first support member;

a tubular member having a first opening at a first end and a second opening at a second end, wherein a blocking member traverses and selectively blocks the second opening of the tubular member,
   wherein the tubular member is rotatably coupled to the second support member and configured to be rotatable between a first position and a second position,
   wherein the tubular member is flared outwards at a first opening of the tubular member, and
   wherein a spring biases the tubular member to reside in the first position; and
a concave rest configured to support an underside of the tubular member when the tubular member is in the first position; and
an eyelet coupled to the first support member, the eyelet configured to secure a safety mechanism from the eyelet to a secondary location to secure a location of the fishing rod holder.

2. The rod holder of claim 1, wherein the tubular member is attached to the second support member via a spring attachment.

3. The rod holder of claim 1, further comprising:
an anchor member coupling the first support member and the second support member.

4. The rod holder of claim 1, wherein the support is positioned below a midline of the tubular member.

5. The rod holder of claim 1, wherein a base of the trough is below a midline of the tubular member.

6. The rod holder of claim 1, wherein an inner surface of the tubular member is lined with a protective material.

7. The rod holder of claim 1, wherein the support is lined with a deformable material.

8. The rod holder of claim 1, wherein the first support member and the positioning member are at an angle of between about 35° to about 65° with respect to each other.

9. The rod holder of claim 1, wherein the tubular member is flared from the first opening to the second opening.

10. The rod holder of claim 1, wherein the positioning member, the first support member, the second support member, and the tubular member comprise a metallic material.

11. The rod holder of claim 1, wherein the blocking member contains at least one aperture.

12. A rod holder comprising:
a positioning member;
a first support member and a second support member extending from the positioning member,
   wherein the first support member comprises a first bend and a second bend along a length of the first support member;
a support disposed on a first end of the first support member,
   wherein the support comprises a first flange and a second flange such that a trough is formed between the first flange and the second flange;
a tubular member having a first opening at a first end and a second opening at a second end, the tubular member having a protective covering disposed on an inner surface,
   wherein the tubular member is rotatably coupled to the second support member and configured to be rotatable between a first position and a second position,
   wherein a spring biases the tubular member to reside in the first position,
   wherein the tubular member is flared outwards at a first opening of the tubular member, and
   wherein a blocking member traverses and selectively covers the second opening of the tubular member;
a concave rest configured to support an underside of the tubular member when the tubular member is in the first position,
   wherein the underside of the tubular member is configured to reside directly upon an upper surface of the concave rest; and
an eyelet coupled to the first support member, the eyelet configured to secure a safety mechanism from the eyelet to a secondary location to secure a location of the fishing rod holder.

13. The rod holder of claim 12, wherein:
the support is positioned below a midline of the tubular member, and the blocking member has at least one aperture.

* * * * *